July 3, 1956
E. G. HAAG
2,753,234
VACUUM TABLE
Filed Oct. 22, 1954
5 Sheets-Sheet 1
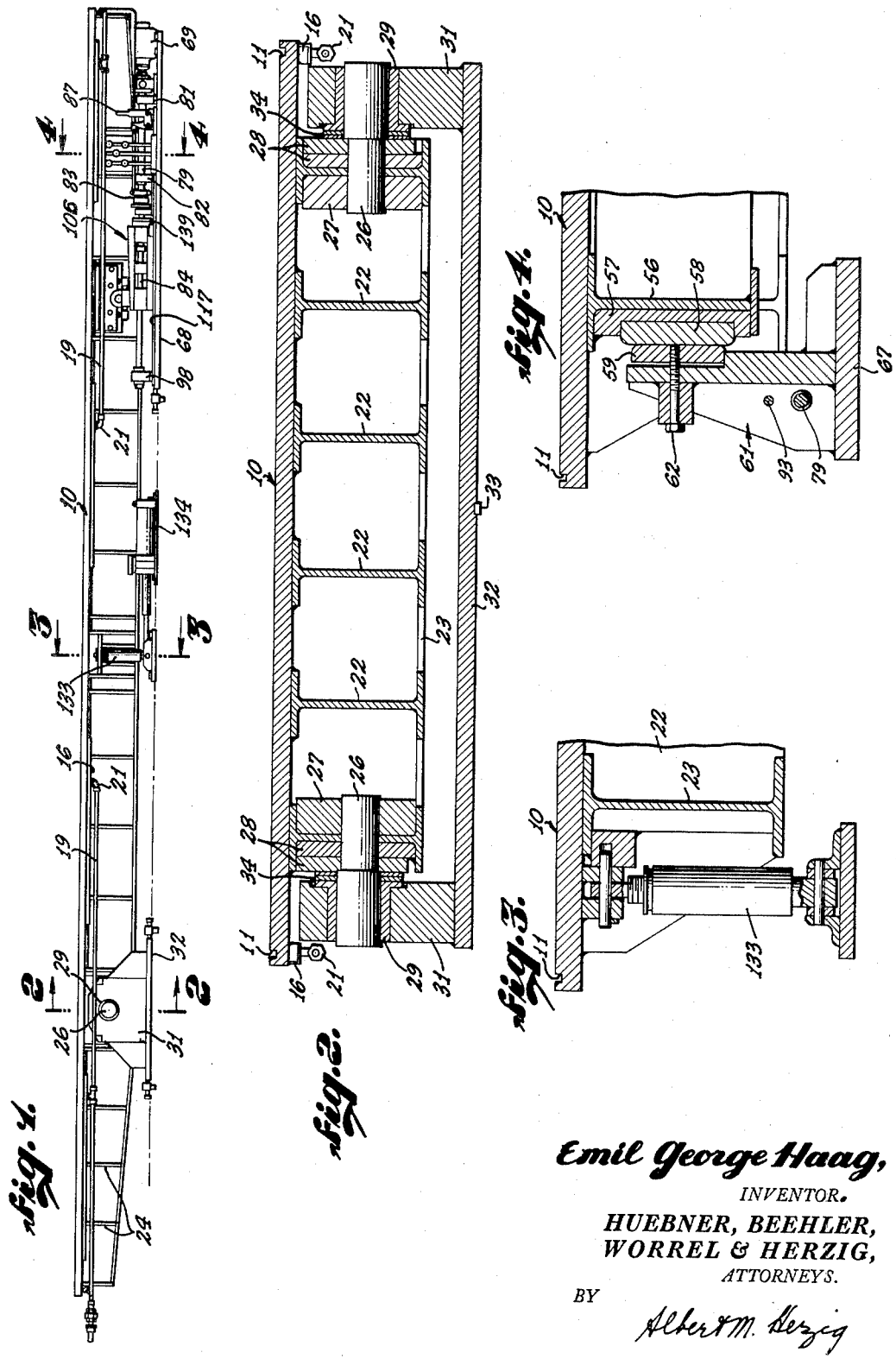
Emil George Haag,
INVENTOR.
HUEBNER, BEEHLER,
WORREL & HERZIG,
ATTORNEYS.
BY
Albert M. Herzig

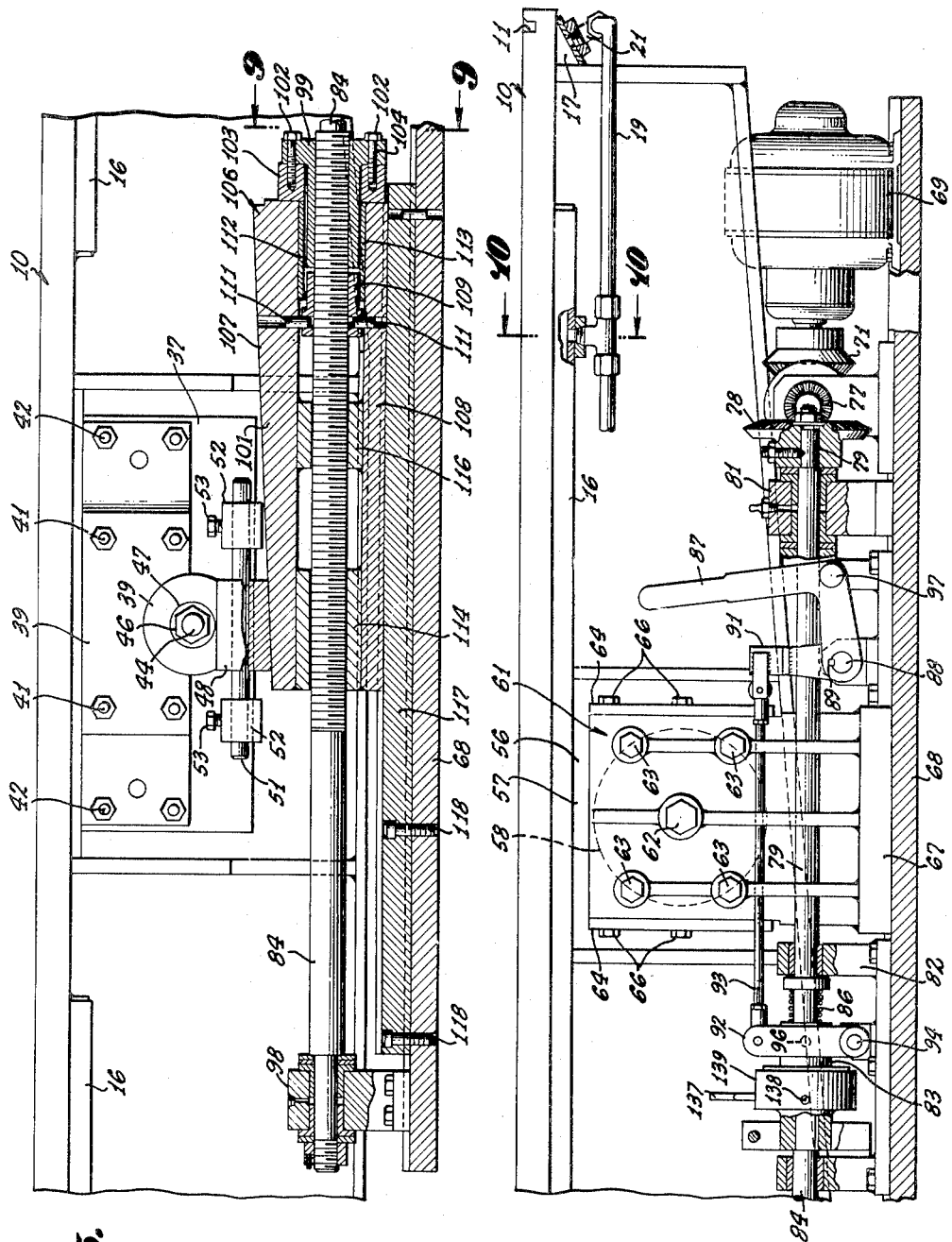

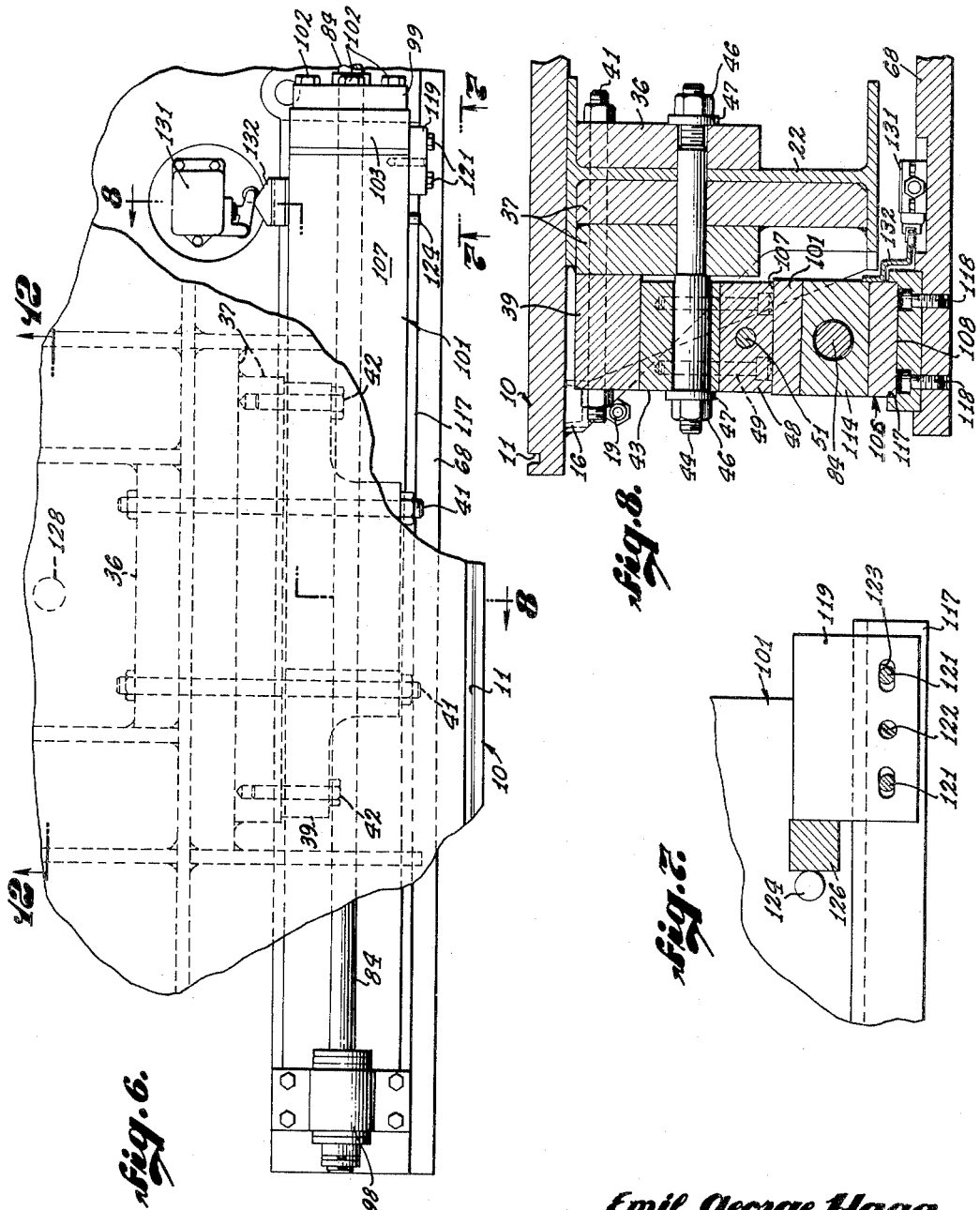

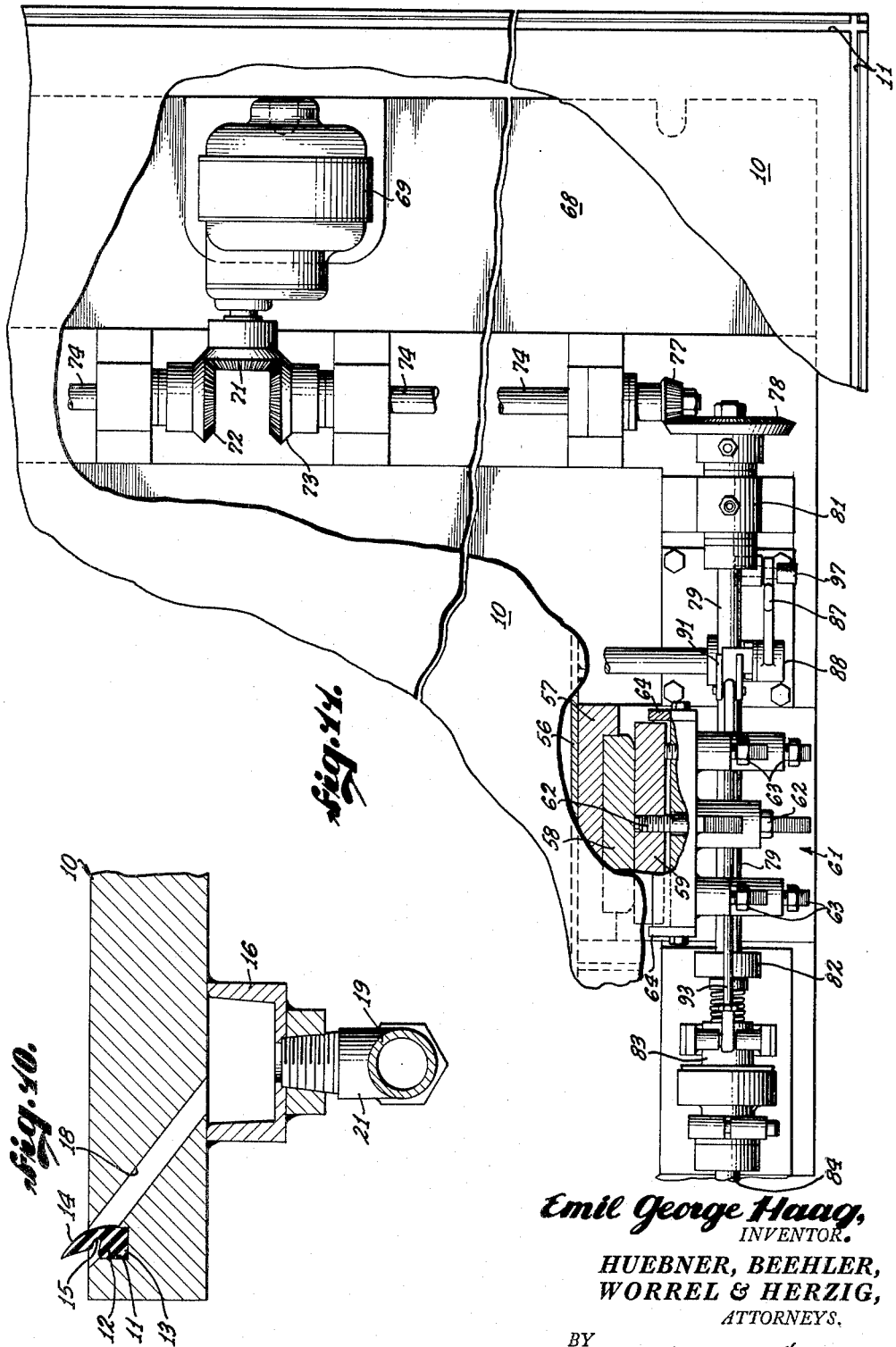

July 3, 1956     E. G. HAAG     2,753,234
VACUUM TABLE
Filed Oct. 22, 1954     5 Sheets—Sheet 5
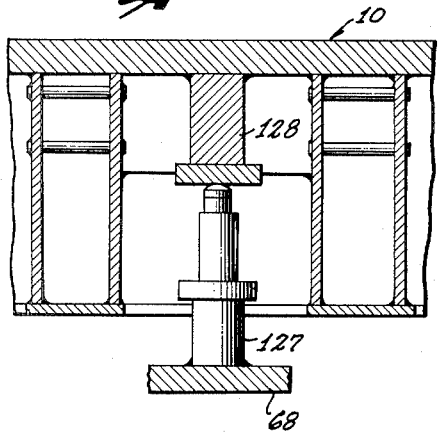
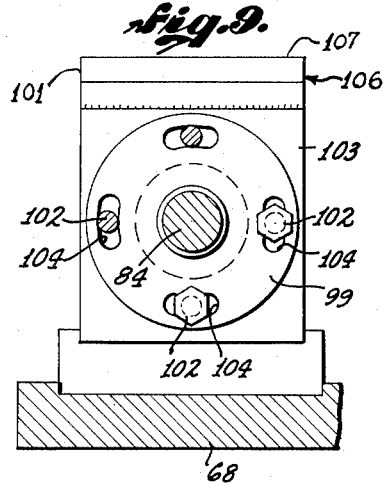
Emil George Haag,
INVENTOR.
HUEBNER, BEEHLER,
WORREL & HERZIG,
ATTORNEYS.
BY

… … …

United States Patent Office 2,753,234
Patented July 3, 1956

2,753,234
VACUUM TABLE

Emil George Haag, Inglewood, Calif.

Application October 22, 1954, Serial No. 463,882

1 Claim. (Cl. 311—38)

The present invention relates to an adjustable table for supporting elongated work objects, and in particular to a table for holding work objects thereon by means of reduced pressure between the bottom of the object and the top of the table during machining thereof.

An important object of the present invention is to provide an adjustable table for holding thereon work objects without the use of clamps for the purpose of machining the same.

Another object is to provide an apparatus for rapidly and accurately adjusting the level of a table loaded with an elongated work object.

A further object is to provide a work table for fixedly holding an elongated work object without the use of clamps thereon and one provided with an adjustment apparatus efficiently designed for precisely locating the level of the table.

An additional object is to provide an adjustable work table for fixedly holding a work object in space by means of reduced pressure generated between the object and the tabletop and provided with a leveling mechanism of efficient design and simplicity of operation.

Other objects will become apparent upon reading the following description.

Broadly stated, the present invention comprehends an adjustment apparatus comprising support means provided with a guide surface, an inclined plane slidably mounted on the guide surface, an internally threaded member fixed to the inclined plane and an externally threaded member threadedly meshed with the internally threaded member and connected with rotary power means for turning the externally threaded member in the internally threaded member for sliding the inclined plane along the support means. The adjustment apparatus is particularly designed to be used with a table pivotally supported at one end thereof and provided with the adjustment apparatus mounted under the other end thereof. In a specific embodiment of the invention, an elongated table is adapted to hold an elongated work object by means of reduced pressure generated between the bottom of the work object and the top of the table. One end of the table is pivotally mounted for vertical rotation of the table about the pivot, the other end of the table is provided with adjustment apparatus at each side of the table. This latter end of the table also is provided with hydraulic lift cylinders for raising and lowering this end of the table while pivoting the other end of the table about the pivot mounting means. The middle of the table is supported by two hydraulic lift or support cylinders which support over half the load applied at this point.

A more detailed description of a specific embodiment of the invention is given with reference to the drawings, wherein:

Figure 1 is a side elevational view showing the table equipped with a pivot mounting means at one end, adjustment apparatus at the other end, and hydraulically actuated support cylinders in the middle;

Figure 2 is a cross-sectional view taken on the line 2—2 of Figure 1 and showing the pivot mounting means;

Figure 3 is a cross-sectional view taken on the line 3—3 of Figure 1 and showing details of the hydraulic support cylinders;

Figure 4 is a cross-sectional view taken on the line 4—4 of Figure 1 and showing hardened side thrust blocks;

Figure 5 is a side elevational view in two portions showing a sine block and wedge arrangement, wherein the wedge is shown in cross-sectional elevation and drive mechanism for actuating the wedge;

Figure 6 is a plan view showing a microswitch and the wedge of the adjustment apparatus at one side of the table;

Figure 7 is a view along line 7—7 of Figure 6 showing the gauging means of the adjustment apparatus;

Figure 8 is a cross-sectional view taken on the line 8—8 of Figure 6 and showing details of the sine block and wedge arrangement;

Figure 9 is a cross-sectional view taken on the line 9—9 of Figure 5 and showing threaded engagement of an internally threaded member of the wedge with an externally threaded drive shaft;

Figure 10 is a cross-sectional view taken on the line 10—10 of Figure 5 and showing a flexible vacuum seal and communication between a vacuum system and the table top for evacuating space between the bottom of an object resting on the table and the top of the table;

Figure 11 is a plan view, with parts broken away, of the drive mechanism of the adjustment apparatus and the hardened side thrust blocks adapted to prevent sidewise movement of the table; and Figure 12 is a cross-sectional view taken on the line 12—12 of Figure 6 and showing a hydraulic lift cylinder engaging a boss extending from the bottom of the table.

Table top 10 is provided with seal grooves 11 that run the length and width of the table adjacent the edges thereof and form a border around the table top. A vacuum seal 12 made of a flexible material such as a synthetic elastomer, preferably neoprene, is fitted into the seal groove 11. The vacuum seal 12 consists of a square shaped bottom portion 13 and a top portion 14 curving convexly outwardly from the inside of the table and curving concavely inwardly from the outside of the table. The bottom portion 13 and the top portion 14 of the seal are separated by a lateral groove 15 running along the length of the seal. Four vacuum channels 16 attached to the bottom of the table 10 are spaced along each side of the table. Similar vacuum channels 17 also are mounted at the bottom of each end of the vacuum table 10. The channels 16 and 17 communicate with the seal grooves 11 through holes 18 passing through the table top 10 as best shown in Figure 10. The channels 16 and 17 also communicate with the vacuum line 19 through communicating connections 21. The vacuum line in turn communicates with a parallel vacuum pump unit (not shown) having a vacuum reservoir and an automatic vacuum hose reel.

The table top 10 is mounted on longitudinal I-beams 22 the upper surface of which is welded to the bottom surface of the table top. Throughout the middle portion of the table the I-beams are of uniform height, but toward the ends they converge gradually toward the edges of the table top 10 to a fixed height. The middle portion of the table top 10 is reinforced by transverse I-beams 23. The converging end portions of the table are reinforced by flat transverse beams 24. The middle portion of the table top 10 is more heavily reinforced that the converging end portions because most of the load is supported by the middle portion of the table.

Near one end of the middle portion of the table it is provided at both sides with transverse axles 26. The axles 26 are mounted in the outer I-beams 22 by means of blocks 27 fixed to the I-beams. The axles 26 pass through two hard blocks 28 made of suitable material such as hardened steel, which also are fixed to the outer surface of I-beams 26. The outer portions of axles 26 are enlarged and are journaled in bearings 29, mounted in brackets 31. Brackets 31 are joined by a heavy transverse plate 32 at the bases of the brackets. Transverse plate 32 is provided with a longitudinal key 33 to fit the center slot of a skin mill table (not shown) upon which the cross plate 32 is positioned during the use of the table. Two washers 34 are placed on the middle portion of the axle 26 between the hardened block 28 and bearing 29. It will be seen that one end of the table is pivotally mounted in the bracket 31.

At the other end of the middle portion of the table, blocks 36 are welded to the inside surface of the outer I-beams 22. Blocks 37 are fastened to the outsides of the outer I-beams 22 by welding, for example. Side plate 39 is bolted to blocks 37 by means of stud-bolts 41. Screws 42 passing through plate 39 and threaded into taps in outer block 37 additionally fasten the plate 39 to block 37.

Sine blocks 43 are rotatably mounted on the outer portion of axles 44. Axles 44 are in the form of stud-bolts having enlarged outer portions for journaling in the sine blocks 43 and are mounted in blocks 36 and 37 by means of nuts 46 and washers 47. A base portion 48 is fixed to sine block 43 by means of screws 49 passing through the base portion 48 and threaded into taps in sine block 43. A cross bar 51 passes through the bottom portion 48 and is provided at the outer ends thereof by counterweights 52 fixed thereto by means of set screws 53. The counterweights 52 are provided to maintain the sine blocks in a vertical position at all times.

On outer beams 56 fixed to the bottom surface of table top 10 are fastened, on the outer surface thereof, blocks 57. Centrally thereof are circular depressions machined therein to accompany circular hardened steel blocks 58. Face to face with hardened block 58 is another circular hardened steel block 59 of somewhat smaller dimensions. Hardened side thrust blocks 58 and 59 are designed to rigidly support table top 10 against side thrust tending to displace or dislocate the same.

Block 59 is mounted and locked in position in bracket 61 by means of a cap screw 62 passing through the bracket and threaded into the center of block 59. Block 59 can be moved toward or from the face of block 58 for table adjustment purposes by means of cap screws 63 threaded in bracket 61. Side strips 64 are fastened to the edges of bracket 61 by means of screws 66 threaded into tapped holes in the edges of bracket 61. The base 67 of bracket 61 is fastened to the base plate 68 of an adjustment apparatus such as by means of bolts.

The base plate 68 of the adjustment apparatus is placed under the end of table 10 opposite the pivotally mounted end mounted on bracket 31. Near the outer end of base 68 is mounted a reversing motor 69 (see Figures 5 and 11). The drive shaft of motor 69 is provided with a bevel gear 71, meshed with two bevel gears 72 to drive shafts 74. At the ends of shafts 74 are bevel gears 77 meshed with bevel gears 78 for driving shafts 79 on each side of the adjustment apparatus. Drive shafts 79 are rotatably mounted in bearings 81 and 82 and in brackets 61. On the end of each drive shaft 79 is mounted a clutch 83 which normally is urged into engagement relationship with a shaft 84 by means of compression spring 86. The clutch 83 is disengaged from driving connection with shaft 84 by means of a hand lever 87. Lever 87 is pivotally mounted on an axle 88 by means of a key 89. Fixed to axle 88 is an arm 91 linked to a bracket 92 by means of a link 93, slidably mounted in bracket 61. Bracket 92 is pivotally mounted at 94 and is connected to clutch 83 at 96 as indicated. Lever 87 is provided with a locking pin 97 which is slidable through the lever and into one of two holes positioned one above the other adjacent the inside of the lever. When the lever is in the elevated position, it is locked therein by locking pin 97 and drive shaft 79 is in driving engagement with shaft 84. When lever 87 is depressed and locked in position in the lower of the two holes by pin 97, drive shaft 79 is disengaged from shaft 84 at clutch 83.

The end of shaft 84 is rotatably mounted in bearing 98 fixed to base 68 as indicated. A portion of shaft 84 is threaded and is threadedly engaged in a nut or internally threaded sleeve 99 fixed to one end of a wedge 101 by means of screws 102. Screws 102 are threaded into taps in square collar 103. The screws 102 pass through slotted holes 104 (Figure 9) through threaded sleeve 99. The slotted holes 104 are adjusted for a minimum backlash when the threaded sleeve 99 is actuated by rotation of shaft 84 in a clockwise or counterclockwise direction. The collar 103 is fixed to the outer end of a horizontally disposed wedge assembly 106. The wedge 101 is provided with an inclined plane top 107 and a flat base 108. A second nut or internally threaded sleeve 109 is threadedly meshed on the threaded portion of shaft 84 and is held in position between inclined plane 107 and the base of the wedge 108 by means of dowel pins 111. Plates 112 and 113 are tightly fitted below inclined plane 107 and above base 108 to tightly fit internally threaded sleeves 99 and 109 between the inclined plane 107 and the base 108. Blocks 114 and 116 also are fitted between inclined plane 107 and base 108 and are permanently positioned therebetween as by welding. The blocks 114 and 116 are bored centrally thereof for the passage therethrough of shaft 84.

The wedge assembly 106 is slidably disposed on wedge slide 117 which in turn is fixed to base plate 68 by means of screws 118 passing through wedge slide 117 and threadedly engaged in taps in base 68. The position of wedge 101 relative to the sine block 43 determines the elevation of the end of the table top 10 above the floor. For the purpose of gauging the relative position of the wedge, a gauge block 119 (Figure 7) is fastened to the outer wall of wedge slide 117 by means of bolts 121 and set screw 122. Holes 123 are slotted for adjustment purposes. A gauge pin 124 is press fitted into both sides of the wedge 106. The predetermined space between gauge pin 124 and gauge block 119 for the table top 10 to be perfectly horizontal is set by means of a Johnson block 126 positioned between the pin 124 and gauge block when the table top 10 is brought into the horizontal plane.

Two hydraulic lift cylinders 127 are fastened to the base plate 68 in linear transverse alignment and are operatively connected with a hydraulic pressure fluid line (not shown). During use the hydraulic lift cylinders 127 are positioned below bosses 128 extending from the bottom of table top 10 (Figure 12). Hydraulic fluid under pressure for activating lift cylinders 127 is supplied by means of a hand pump (not shown).

In operation the adjustment apparatus assembled on base plate 68 is placed on the top of a skin mill table (not shown) or any other desired flat or level surface of satisfactory location. The table top 10 assembly similarly is placed upon the top of the skin mill table, or other chosen surface. In the case of a skin mill table, alignment of the table top 10 above the top of the skin mill table is facilitated by positioning of key 33 in a slot on the skin mill table top. When properly positioned as shown in Figure 1, the bottoms of bosses 128 extending from the bottom of table top 10 should bear against the tops of lift cylinders 127. The pistons in lift cylinder 127 preferably should be extended so that the end of the table is above the horizontal plane and sine block 43, including base block 48, is above the upper surface of inclined plane 107. Lever 87 is elevated so that the shaft 79 and clutch 83 are engaged in drive relationship with the shaft 84 and wedge 101. Johnson block 126 is positioned at the inner edge of gauge block 119 and by means of motor 69 the wedge 106 and gauge pin 124 are driven to within a short distance of contacting Johnson block 126 against gauge pin 124. Clutch 83 is disengaged from shaft 79 by lowering lever 87 and locking it in position by the insertion of a locking pin 97. The final adjustment of the wedge 101 is made manually by inserting a spanner wrench 137 into holes 138 in shell 139 fixed to the end of shaft 84 and turning by means of the wrench 137 the shaft 84 to move wedge 101 into position until Johnson block 126 is engaged to the desired degree by both gauge pin 124 and gauge block 119. The table top 10 is then lowered into horizontal position by releasing gradually the hydraulic pressure in hydraulic lift cylinders 127 until the sine block bottom portion 48 engages the top surface of inclined plane 107. In this position table top 10 is in perfectly horizontal relationship with the skin mill table top, as desired.

The work object to be skin milled, such as the wing of a turbo-jet airplane, for example, is lowered onto the top of table top 10 into engagement with the upper portion 14 of vaccum seal 12. The work object is of course flat surfaced over the portion resting on table top 10 and is of sufficient area to contact and depress all of the vacuum seal 12 to form a tight, leak-proof air space between the bottom of the work object and the top of table 10. By means of the vacuum system previously described, this air space between the bottom of the work object and the top 10 of the table is evacuated to the desired reduced pressure to firmly hold the work object in fixed position on top of the table top 10. By virtue of the vacuum between the bottom of the work object and the table top 10, the work object, such as a wing of a turbo-jet airplane, is held firmly enough for skin milling operations. The rigid construction of the table and supporting apparatus also assist markedly in rigidly holding the work object during skin milling operations longitudinally and transversely thereof.

The motor 69 is provided with reverse controls (not shown) for operating the wedge in either direction. Limiting micro-switches 131 are provided to avoid overrunning of the wedge 101. The limits of the running of the wedge are fixed by cams 132 at both ends of the base 108 of the wedge. When either of the cams 132 trips the switch 131, the motor 69 is shut off.

Hydraulically actuated booster cylinders 133 are positioned near the middle of each side of the table as shown in Figure 1. The hydraulic pressure is continuously maintained in the cylinders at a predetermined value by means of a fluid pressure booster 134. The booster cylinders 133 are positioned on top of the skin mill table top and are adjusted to support over half the load on table top 10, preferably three-quarters, or more, of the load. In this manner any table top 10 deflection tending to be produced by the load placed thereon is reduced to a minimum.

Among the novel features incorporated in the above-described table and mechanism are the following: No clamps are used to hold the work in place. This makes the entire surface of the work object machinable, thereby saving material and eliminating some machining and trimming operations and also eliminating expensive holding fixtures. The simplicity of operations of the above-described table and mechanism reduces the set-up time to an absolute minimum.

In an actual embodiment of a specific design of the above described invention, a table 30 feet long, 8 feet wide and 18½ inches high was made of all steel weld construction. The table weighed 35,000 lbs. and was constructed to have a maximum vertical deflection of .006 inch with the booster cylinders 133 in action. The use of a neoprene seal 12 guaranteed a highly efficient vacuum seal between the work piece bottom and the table top 10 providing the underside of the work piece was free from scratches over .002 inch deep and had not more than ⅛ inch warp at the highest point.

The sine block arrangement consisted of two wedges having a 1¼ inches by 2½ degree rise driven by a ⅓ horsepower, 220 volts, 3-phase 60 cycle, 780 R. P. M., gear-head splash proof motor. The gauge length was calculated by the following formula: gauge length equals rise of inclined plane divided by length of inclined plane times a constant, plus .750. The gauge length between the gauge block 119 and the gauge pin 124 was .750 inch, that is, the Johnson block had a gauge length of .750 inch. In other words, the top 10 of the vacuum table was parallel to the top of the skin mill table when the distance between the gauge block and the gauge pin was .750 inch. The reduced pressure used was equivalent to 28 inches of mercury and was generated by a parallel vacuum pump unit consisting of two 2-horsepower, 220 volts, 3-phase, 60 cycle, drip-proof motors mounted side by side, connected to two vacuum pumps having separate forced air cooled oil heat exchangers with individual automatic vacuum control switches.

Although the specific embodiment of the invention described and illustrated above has been shown in connection with certain structural and design features, including certain auxiliary equipment and dimensions of the table and auxiliary apparatus, and weight and load features of the apparatus, it will be understood that the vacuum table of the invention can be varied and modified considerably as to details and structure thereof as will occur to one skilled in the art. It is, therefore, understood that the foregoing description is explanatory only and given to specifically illustrate a particular embodiment of the invention. Accordingly, although a specific embodiment of the invention has been described above, it will be understood that such changes and modifications in the design and structural details thereof may be made within the scope of the appended claim without departing from the spirit of invention.

What I claim is:

Adjusting means for a platform device having a base, an elongate platform mounted on said base for pivotal movement adjacent an end thereof on a horizontal axis, selectively adjustable wedge means mounted for adjustment between the base and the platform adjacent the opposite end of the latter and including wedge-engaging means on the platform and the base respectively for selectively establishing the height of said opposite platform relative to said first platform end, adjustable means between the base and the platform, adjacent said opposite end thereof, for preventing lateral movement of the platform relative to the base, power means for selectively moving said wedge means to a predetermined extent and further manual means independent of said power means for moving said wedge to a further predetermined extent, control means at predetermined positions along the path of movement of said wedge means for disconnecting the power means from said wedge means, and locking means arranged to lock said wedge means at any position thereof along its path of movement.

References Cited in the file of this patent

UNITED STATES PATENTS

| | | |
|---|---|---|
| 1,521,341 | Thacher | Dec. 30, 1924 |
| 2,250,965 | Pritz | July 29, 1941 |

FOREIGN PATENTS

| | | |
|---|---|---|
| 519,366 | Germany | Apr. 22, 1925 |